W. H. REED.
TIRE.
APPLICATION FILED MAY 14, 1910.

1,011,894.

Patented Dec. 12, 1911.

Witnesses:
Gertrude B. Lynch
Louis Lucia

Inventor:
William H. Reed.
by N. E. Hart
his attorney

UNITED STATES PATENT OFFICE.

WILLIAM H. REED, OF HARTFORD, CONNECTICUT, ASSIGNOR TO REVERE RUBBER COMPANY, OF PROVIDENCE, RHODE ISLAND, A CORPORATION OF RHODE ISLAND.

TIRE.

1,011,894.  Specification of Letters Patent.  Patented Dec. 12, 1911.

Application filed May 14, 1910. Serial No. 561,289.

*To all whom it may concern:*

Be it known that I, WILLIAM H. REED, a citizen of the United States, and a resident of Hartford, in the county of Hartford, State of Connecticut, have invented certain new and useful Improvements in Tires, of which the following is a specification.

The object of the invention is to produce a solid rubber tire primarily designed for use on heavy commercial vehicles, and particularly such as are motor driven, which has features of novelty and advantage, especially in the way in which the tread is secured to the wheel.

Figure 1:
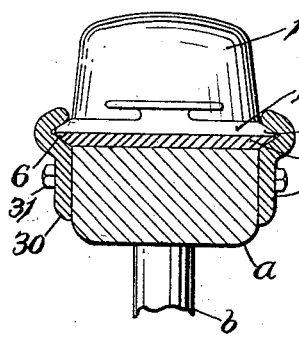
Figure 2:
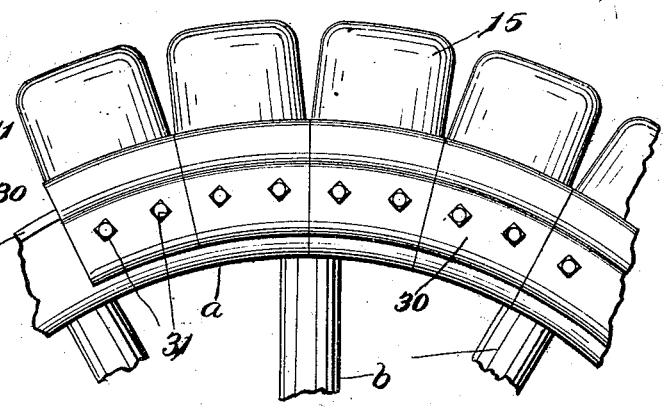
Figure 3:
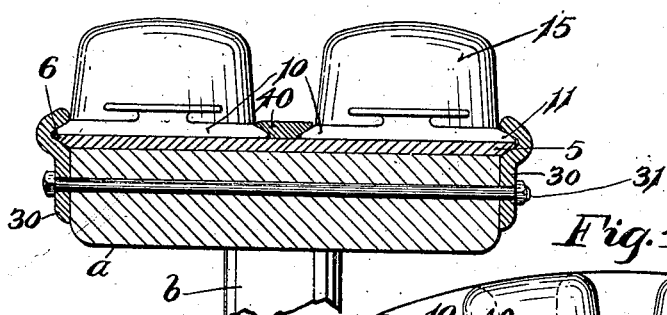
Figure 4:
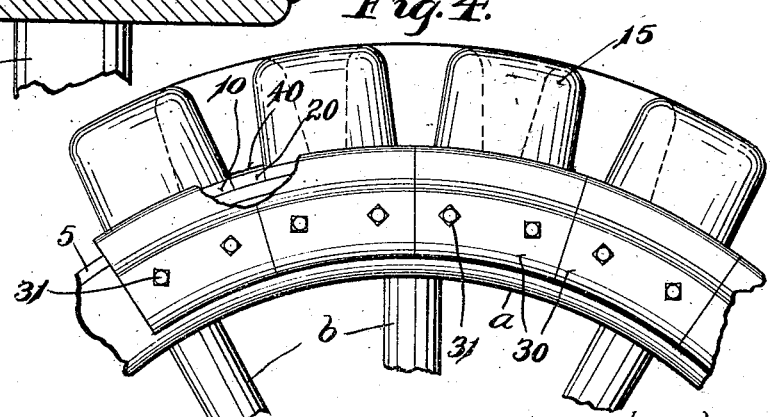

Referring to the drawings: Figure 1 is a transverse sectional view of a tire made in accordance with my invention. Fig. 2 is a side view thereof. Fig. 3 is a transverse sectional view of a double tire made in accordance with my invention. Fig. 4 is a side view thereof.

Referring to the drawings *a* denotes the wheel felly; *b* the spokes; 5 is a steel band or hoop secured to the face of the felly in some suitable way, as by shrinking it on or bolting it through the felly, and the edges of this steel band project slightly beyond the sides of the felly, and have their under sides beveled as indicated at 6.

The tire is made up of a series of tread sections arranged end to end about the felly, each of the tread sections comprising a base plate 10 of the same width as the band 5 the upper edges of which are beveled as indicated at 11—11, and a tread block 15 of rubber or other suitable material which is permanently secured to said base plate, the tread block being of less width than the base plate in order to leave the beveled edges of the latter exposed for the purposes hereinafter described.

One way, and perhaps a most satisfactory way of securing the tread block to the base plate is to provide an undercut projection on the base plate, forming up the tread block to cause it to interlock with this projection, and then curing the block in place, this curing process causing the rubber to securely attach itself to the base plate.

The tread sections are secured to the felly by means of clamping flanges 30—30, which are secured to the sides of the felly by bolts 31. These clamping flanges are provided with V grooves to receive the oppositely beveled edges 6—11 of the band 5 and the base plate 10. It will be evident that as the nuts on the bolts are set home, drawing the clamping flanges together, these V grooves will bind the base plates firmly on to the metallic felly band.

The base plates can be secured to the felly bands in other ways than by these clamping flanges, but the main consideration is to secure the tread sections in place by some means which engages the metallic base plates, thus obviating the use of any securing means which engages the material of the tread block, and providing a more firm and secure means of attachment of the tread sections to the wheel. As will be noted in Fig. 2 the clamping flanges are also made sectional so that if it becomes necessary to remove one or two of the tread sections for repair or replacement, this can be done by removing only a small number of the flanges.

For extra heavy duty the width of the felly is increased as indicated in Figs. 3 and 4, and the tread sections arranged in two rows side by side the adjacent sections in each row being spaced slightly apart as by spacing blocks 20, and the sections of one row staggered with respect to the sections of the other row, as clearly seen in Fig. 4. When used in this way it is necessary to provide a ring 40 located between the two rows of tread blocks and overlying the adjacent beveled edges of the base plates. This can be a floating ring or one which is bolted through the felly.

I have illustrated and described one preferred form of the embodiment of the invention. I realize that it is susceptible of alterations and modifications, and I do not wish to be understood as intentionally limiting myself or the scope of the appended claims to the precise construction illustrated and described.

I claim:—

1. In a wheel tire the combination with the felly and a bevel edged metallic band secured thereto, of a series of bevel edged base plates adapted for arrangement end to end on said band, clamps adapted to engage the bevel edges of said band and base plates, means for moving said clamps to firmly secure said base plates to said band, and a tread block permanently secured to each base plate.

2. In a tire, the combination with a felly and a metallic band secured to the outer face thereof and having beveled edges, of sections arranged end to end about said felly in two rows, each section comprising a base plate and a tread permanently secured thereto, the edges of said base plate being beveled, a ring located between the rows of sections and fitting on the adjacent beveled edges of said base plates, and clamping flanges secured to the sides of said felly and adapted to engage the outer beveled edges of said base plates and the band.

3. In a tire, the combination with a felly, of a band secured thereto and having its edges projecting therebeyond and beveled, a series of base plates disposed end to end directly against the band and having beveled edges in registration with the edges of the band, tread blocks permanently secured upon the base plates, and means secured to the felly and grooved to snugly fit against the said edges of the base plates and the band and clamp the plates to the band.

4. In a tire, the combination with a felly, of a band secured thereto and having beveled edges projecting therebeyond, a series of base plates disposed directly against the band and having beveled edges in registration with the projecting edges of the band, tread blocks permanently secured upon the base plates and narrower at their bases than the said plates, and means secured to the felly and fitting snugly against the said projecting edges of the plates and the band and clamping the plates to the band.

5. In a tire, the combination with a felly, of a rim secured thereto and having beveled edges projecting therebeyond, a series of base plates disposed end to end directly against the band, a tread block secured permanently to each of the base plates, the said plates having projecting beveled edges in registration with the edges of the band, and a series of clamping plates secured to the felly, end to end, and formed with grooves snugly receiving the said edges of the band and the base plates, the end edges of the clamping plates registering with the corners of the respective base plates.

WILLIAM H. REED.

Witnesses:
GERTRUDE B. LYNCH,
LENA E. BERKOVITCH.